SHEET-FEEDING METHOD AND APPARATUS

Inventor
George J. Niccoli
by W. Bartlett Jones,
Attorney

Inventor
George J. Niccoli
by W. Bartlett Jones,
Attorney

Oct. 31, 1967 G. J. NICCOLI 3,350,089

SHEET-FEEDING METHOD AND APPARATUS

Filed June 15, 1965 9 Sheets-Sheet 4

Inventor
George J. Niccoli
by W. Bartlett Jones,
Attorney

SHEET-FEEDING METHOD AND APPARATUS

Inventor
George J. Niccoli
by W. Bartlett Jones,
Attorney

Inventor
George J. Niccoli
by W. Bartlett Jones,
Attorney

SHEET-FEEDING METHOD AND APPARATUS

Filed June 15, 1965 9 Sheets-Sheet 7

Inventor
George J. Niccoli
by W. Bartlett Jones,
Attorney

Inventor
George J. Niccoli
by W. Bartlett Jones,
Attorney

Oct. 31, 1967 G. J. NICCOLI 3,350,089

SHEET-FEEDING METHOD AND APPARATUS

Filed June 15, 1965 9 Sheets-Sheet 9

Inventor
George J. Niccoli
by W. Bartlett Jones,
Attorney

United States Patent Office 3,350,089

Patented Oct. 31, 1967

3,350,089

SHEET-FEEDING METHOD AND APPARATUS

George J. Niccoli, Chicago, Ill., assignor to The Frederick Post Co., Chicago, Ill., a corporation of Illinois Filed June 15, 1965, Ser. No. 464,023
11 Claims. (Cl. 270—58)

ABSTRACT OF THE DISCLOSURE

A stack of paper sheets is arranged for forward movement of the top sheet part way off the stack to a position of readiness for further forward movement on demand, and while so moving on demand and before leaving the stack, means is activated to cause the next sheet to trail the first sheet to enter said position of readiness.

The present application is a continuation-in-part of my copending applicaiton Ser. No. 376,788, filed June 22, 1964, now Patent No. 3,279,787.

In said patent a stack of paper sheets is placed so that powered friction roll means on the stack moves the top sheet rearwardly forming a hump, thus moving the forward edge out from under a hold-down blade on the front of the stack. The hump operates a switch which effects reversal of the friction roll means, thus moving the sheet forward and overriding the blade. The hump-switch also starts feed rolls into which the sheet is fed by the friction roll means for movement to a position of readiness where movement is arrested by a limit switch to await a demand for further forward movement. The actuation of the limit switch stops the feed rolls and cuts off the power to the friction roll means which may then be turned by the sheet moving under it on demand. Demand again starts the feed rolls. The sheet is moved by said feed rolls into second feed rolls. When the sheet leaves the first feed rolls, the friction rolls are again actuated to form a hump and bring the next sheet to said position of readiness. While the trailing edge of the first sheet is moving from the friction roll means through the first feed rolls the friction roll means is idle. The longer the sheet, the longer the period of idleness.

According to the present invention this period of idleness is greatly minimized. Immediately after the friction roll means is freed from the first sheet, they are operated to hump the next sheet and cause it to trail the first sheet, but only to said position of readiness.

The present invention relates to means for feeding single sheets from a stack thereof in response to a demand for a sheet, and in particular, to means whereby a second sheet not from the stack demands a fed sheet to combine the two for travel in facial contact preferably with substantially coincident edges.

The invention is useful for reproducing copies from originals as in diazotype printing. In this operation an original is combined with a copy sheet for exposure to produce an image on the copy sheet. By means of the present invention, there is provided a stack of the copy sheets from which stack a sheet may be automatically removed and readied for combining with an original fed to the apparatus.

The object of the invention is to provide means for removing a top sheet from a stack into a position of readiness for further movement on demand.

A particular object of the invention is to cause a moving second sheet to demand a readied sheet to combine with it.

Various other and ancillary objects and advantages of the invention are set forth hereinafter in connection with the accompanying drawings, in which:

FIGS. 1*a* to 1*g* diagrammatically represent the operations and pertinent structure.

FIG. 2 is an electrical diagram of the circuits involved.

FIGS. 2*a*, 2*b*, 2*d*, 2*e* and 2*g* show the sequence of connections in the circuits of FIG. 2.

Figure 13:
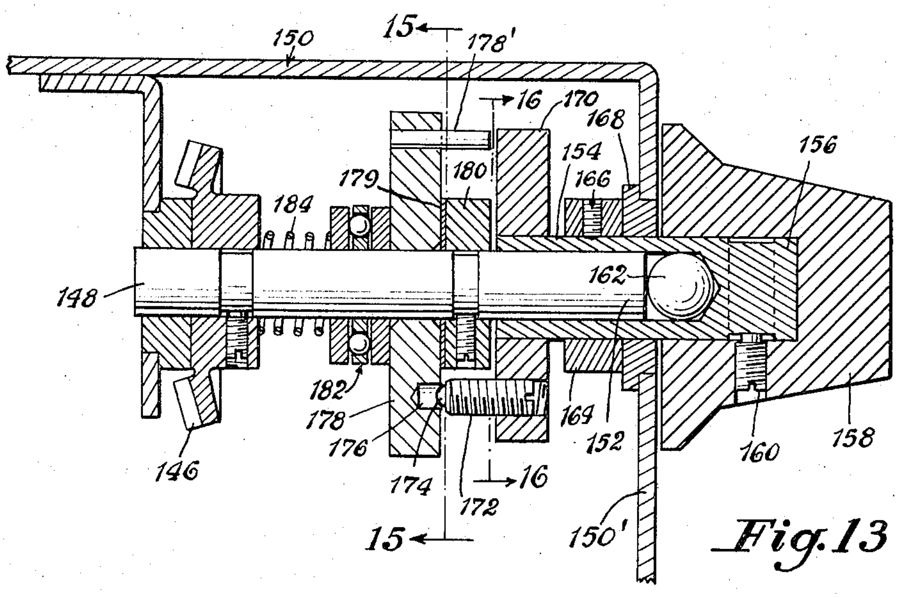
FIG. 13 is a vertical cross-section of an indexing structure of FIG. 10 taken on line 13—13 of FIG. 10.
Figure 15:
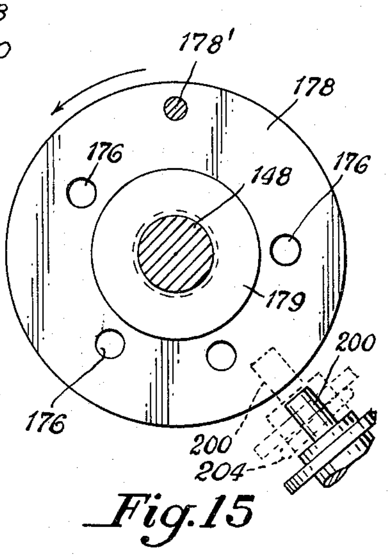
Figure 16:
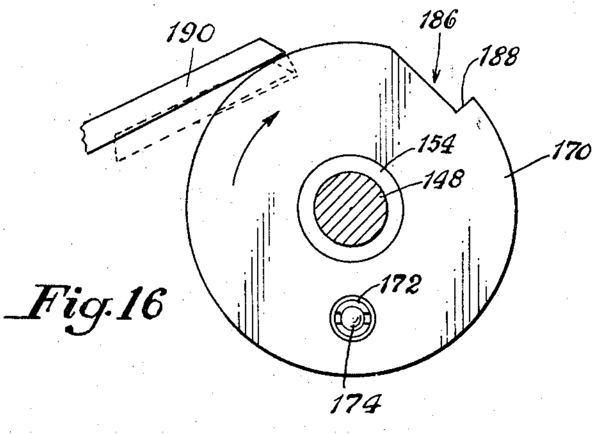

FIGS. 15 and 16 are views of the two disks of the indexing structure, taken respectively on line 15—15 and 16—16 of FIG. 13.

Figures 2, 8:
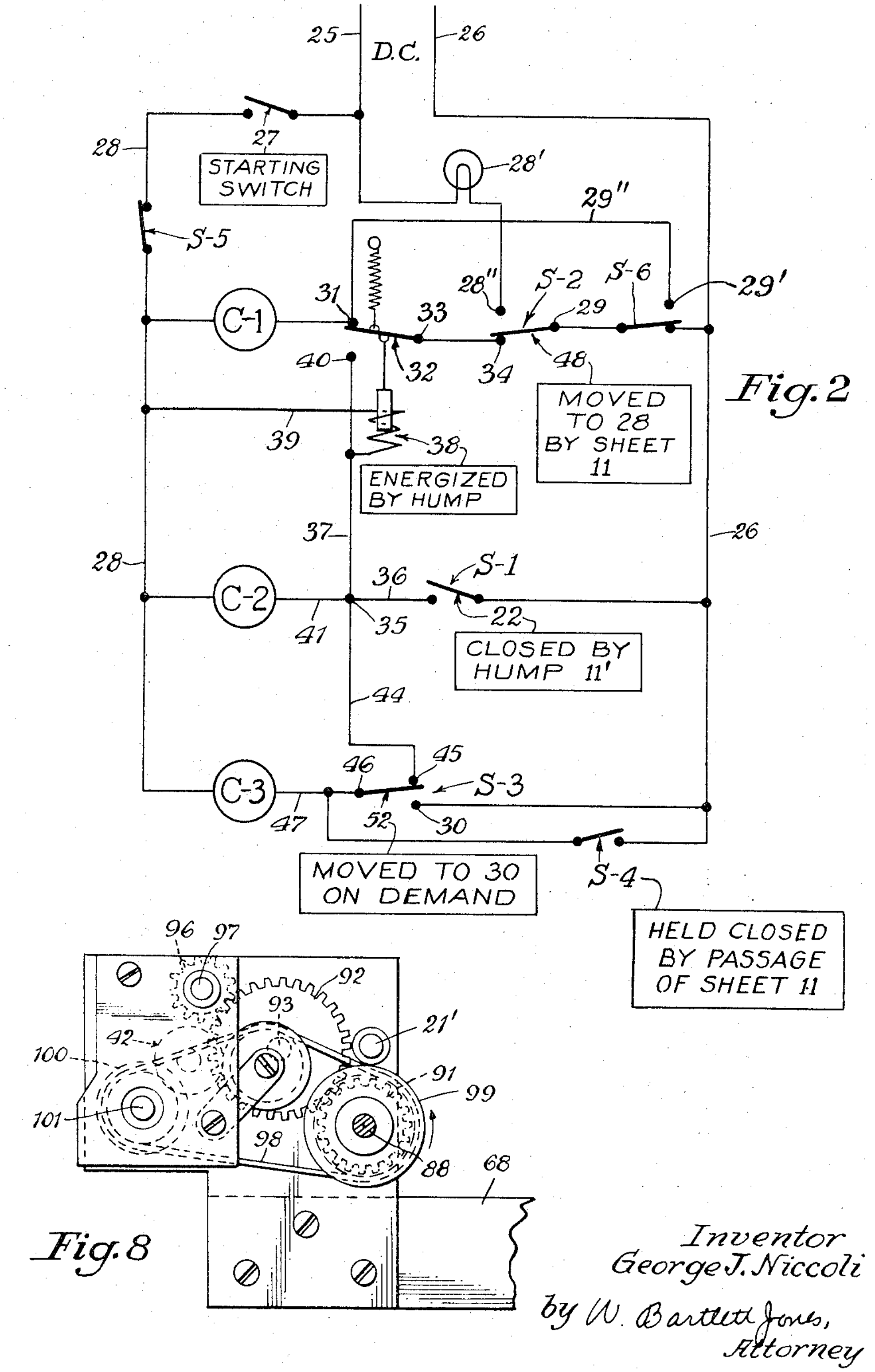
FIGS. 7 and 8 are different views of the gear trains.
Figure 17:
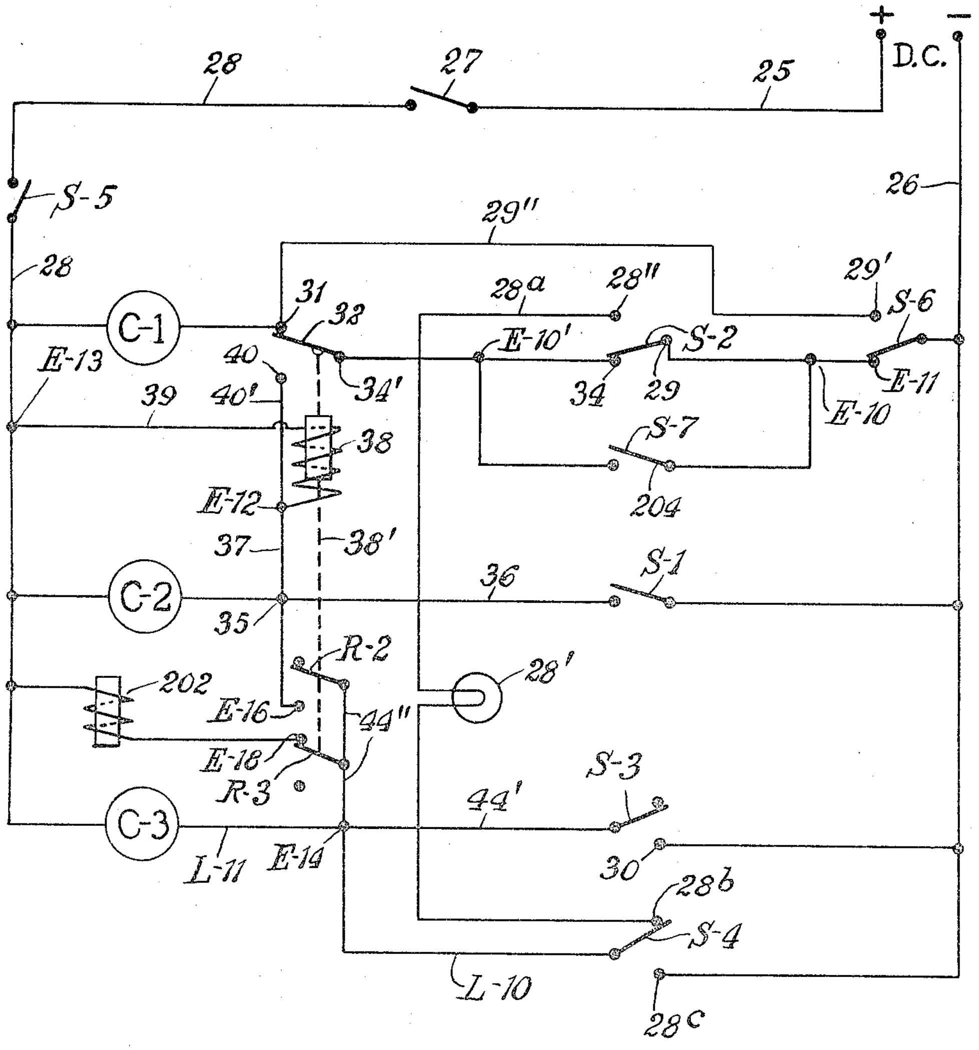

FIG. 17 is a modification of FIG. 2 showing modified circuitry for the modification in FIGS. 10 to 15.

In general, the sequence of steps is to confine the rear end of the top sheet of the stack, preferably by confining and holding down the rear of the stack, confining and holding down the front edge of the stack by means including a thin blade over at least a portion of a narrow top band at the front edge, then pushing rearwardly the forward portion of the top sheet to remove it from under the blade, and thereby forming a hump. Next the sheet is automatically advanced over the blade and into feed rolls against a limit switch which operates to arrest the forward movement by stopping the feed rolls. Then on demand by suitable means the feed rolls again operate to feed the sheet for further utilization.

To make the feeding automatic the hump is formed by means including a powered friction roll, and the hump operates a switch to reverse the friction roll to move the sheet and start the feed rolls. When the demand causes the sheet again to advance, the friction roll is not powered and merely idles as the sheet is pulled from under it by the feed rolls.

Figures 1, 2A, 2B, 2D, 2E, 2G:
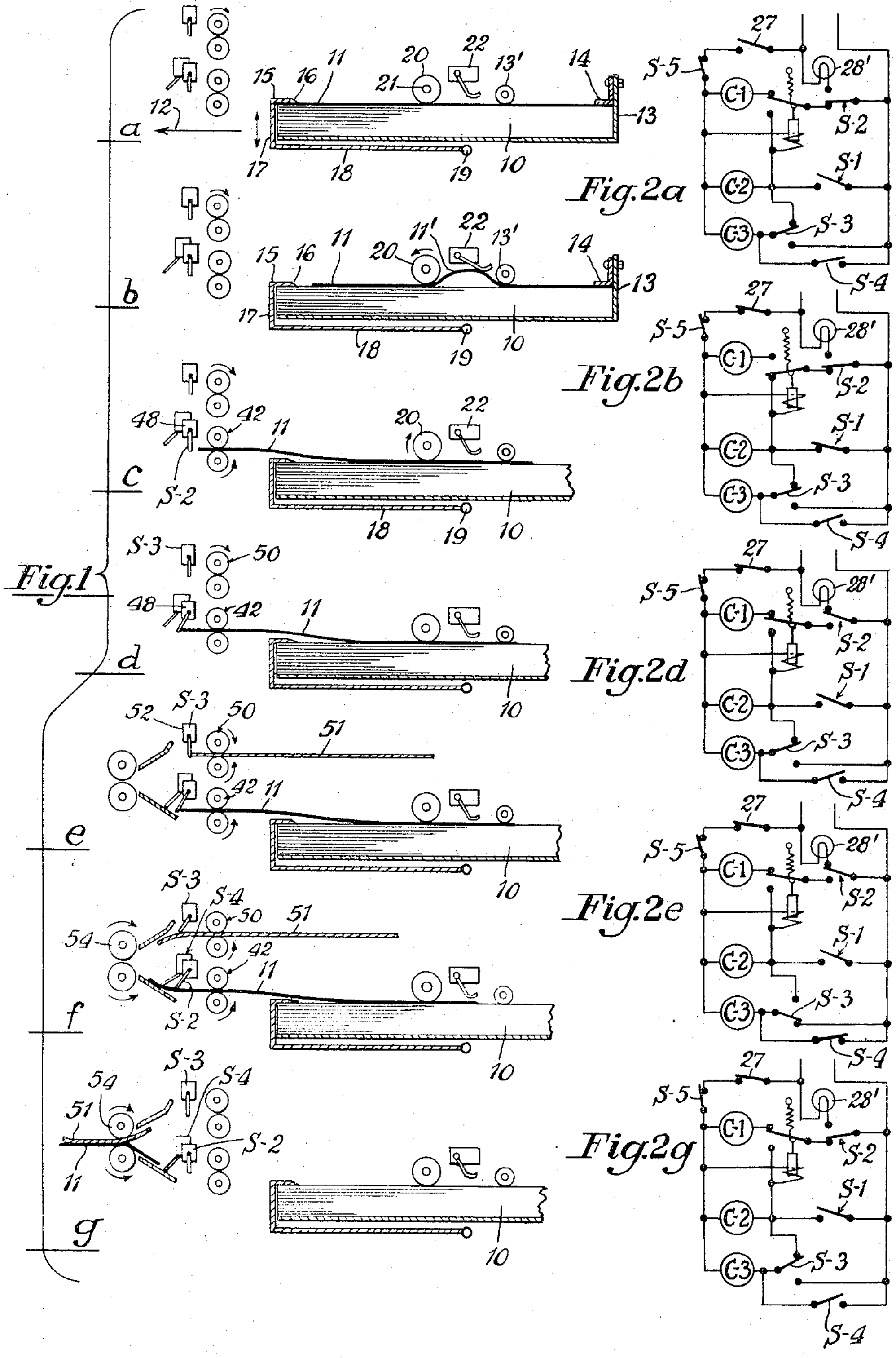

FIG. 1 represents diagrammatically a sequence of operations which can be carried out by the apparatus later described in detail. FIG. 1*a* represents a stack 10 of rectangular sheets, such as light-sensitive diazotype sheets, of which the top sheet 11 is shown by a heavy line. Sheets are to be fed in a forward direction indicated by arrow 12.

The rear end of the stack is backed by a vertical wall 13 and the top sheet is held down by a floating angular member 14 which drops by gravity as the stack is lowered. The back wall 13 with float 14 is positionable rearwardly to accommodate longer sheets. The forward edge of the stack is held against forward movement by means which is automatically lowered as the stack is lowered, and which is so designed that the top sheet of the stack can be moved forward, as described later herein. A suitable means is an angular form providing a thin-edged piece 15 overlying at least a lengthwise portion of a narrow band at the forward edge of the sheet. The edge 16 of the piece 15 is almost a knife-edge so as not to provide an obstruction, as later mentioned. The piece 15 is weighted down, being a flange on an angular member having front plate 17 and bottom plate 18 on a fixed pivot 19, so that the whole drops as the stack is lowered, and so that the edge 16 rests on the last sheet of the stack.

Forward of the hold-down 14 is a weighted roll means 13' also functioning to hold down the rear portion of the top sheet, said roll means being freely rotatable as the sheet is drawn forward from under. It serves as a back stop to locate the hump at the desired region to actuate an electric switch. The forward position of the hold-down roll means 13' is adjustable to function properly with different weights of the stacked paper.

On top of the stack as shown is friction-roll means 20 on a shaft 21 arranged by controlled clutch connections to the shaft to move the top sheet first rearwardly and then forwardly, and to idle when the sheet is otherwise moved. Between the roll means 20 and the rear edge is a normally open trigger-operated switch 22 positioned to be closed as shown in FIG. 1*b* by forming a hump 11'.

FIG. 2 shows diagrammatically a suitable electric circuit with certain associated mechanical parts to supplement the explanation of FIG. 1. FIG. 2 represents switches designated S–1, S–2, S–3 and S–4, being numbered in their sequence of operation, and by safety switches S–5 and S–6. It also represents three clutches C–1, C–2 and C–3, numbered in accordance with the sequence of operation.

S–2(NC–NO) refers to a single pole double throw switch, NC meaning normally closed and NO meaning normally open. Direct current low voltage power lines are designated 25 and 26. A manually operated starting switch 27 is connected one side to power line 25 and the other side to line 28. A pilot light 28' is connected one side to line 25 and the other side to normally open contact 28'' of switch S–2(NC–NO), of which the pole contact 29 is connected to hot line 26. Hot line 26 is connected to switch S–1(NO) which is switch 22 in FIG. 1*a*, and to the normally open contact 30 of single pole double throw switch S–3(NC–NO). Switch S–4(NO) is in parallel with switch S–3 and is closed by the passage of a sheet 11. Switch S–5(NC) is opened when the last sheet of stack 10 is used. Switch S–6(NC) is opened from the normally closed position when by some circumstance a sheet 11 is crumpled above the stack 10 without being fed. So opened, it is moved to a contact 29' connected by line 29'' to contact 31. This action deenergizes clutch C–2 to stop the forward feed, and energizes clutch C–1 to initiate backward feed until a new hump again effects forward feed. Thus, a sheet may automatically move back and forth until it clears the hold down bar at the forward edge.

The remaining portions of the circuitry of FIG. 2 are described in conjunction with further description of FIGS. 1*a* to 1*g*. Opposite the FIGS. 1*a*, 1*b*, 1*d*, 1*e* and 1*g* are FIGS. 2*a*, 2*b*, 2*d*, 2*e* and 2*g*, showing the status of various switches of FIG. 2 in the same wiring diagram, minus the indicia. In the sub-FIGS. 2, the safety switch S–6 is omitted since its function is collateral and for an emergency condition. FIGS. 1*a* and 2*a* show the idle status with starting switch 27 open. FIGS. 1*b* and 2*b* show the starting switch 27 closed and the switch S–1 being closed momentarily by hump 11', to effect the status shown in FIG. 1*c*, sheet 11 being moved into and by feed rolls 42 toward limit switch S–2. FIGS. 1*d* and 2*d* show the sheet 11 opening the limit switch S–2 to halt rotation of feed rolls 42 by clutch C–3 and to light the signal lamp 28' and open the circuit to the relay coil. FIGS. 1*e* and 2*e* show an additional sheet 51 operating demand switch S–3 to create the movement indicated in FIG. 1*f* by energizing clutch C–3 for feed rolls 42. In FIG. 1*f*, the sheet 11 is longer than sheet 51, which latter on leaving switch S–3 would stop the feed rolls 42 which move sheet 11, except that passage switch S–4 is positioned to be closed by sheet 11 after switch S–2 is operated by approach of sheet 11. Thus, either or both of sheets 11 and 51 in passing switches S–3 and S–4 keep the feed rolls 42 in operation. FIGS. 1*g* and 2*g* show the sheets 51 and 11 past their respective switches, thus again engaging clutch C–1 to effect the status of FIGS. 1*b* and 2*b*.

The shaft 21 (FIG. 1*a*) is rotated by engaging magnetic clutch C–1 (FIG. 2) which is energized by closure of manual switch 27 completing the circuit: line 28, clutch C–1, contact 31 of normally closed double throw single pole relay switch 32 and its pole contact 33, contact 34 of normally closed switch S–2(NC–NO) including its pole contact 29, normally closed safety switch S–6, and hot line 26.

Clutch C–1 effects rotation of the friction roll 20 to move sheet 11 (FIG. 1*b*) rearwardly forming the hump 11'. Forming the hump introduces air between the top sheet and the stack below to assure clean separation of the top and second sheets. Switch S–1(NO) of FIG. 2 is shown as switch 22 in FIGS. 1*a* and 1*b*, and as being closed by the hump in FIG. 1*b*. The effect of the closure is to reverse the rotation of the friction roll 20 and starting the feed rolls 42. This is accomplished through the relay switch 32 by deenergizing clutch C–1 and energizing magnetic clutch C–2, both connected to turn shaft 21.

In FIG. 2 to the right of C–2 there is a junction point 35 with connection 36 to switch 22, and connection 37 to energize a solenoid 38 connected by line 39 to power line 28. Junction 35 is also connected to a second contact 40 of relay switch 32, so that energizing the solenoid 38 by the hump-closing of switch 22 disengages magnetic clutch C–1, and maintains the solenoid energized after the switch 22 is opened by removal of the hump. Junction 35 is also connected by line 41 to magnetic clutch C–2, connected also to line 28. Thus, when switch 22 is closed by hump 11', the clutch C–2 effects reversal of the shaft 21 so that the sheet 11 is fed forward as shown in FIG. 1*c*.

In FIG. 1*b* the sheet is pulled out from under the edge 16, which, being like a knife-edge, permits the sheet 11 to ride forwardly over it without being obstructed by the edge 16, as shown in FIG. 1*c*. Forward movement of the sheet 11 carries it to the set of feed rolls 42 which are rotating to advance the sheet concurrently with friction roll means 20. Rotation of feed rolls 42 is effected by energizing magnetic clutch C–3, as follows:

The power to energize clutch C–3 is effected through path: line 26, switch S–6, contact 29, switch S–2(NC–NO), contact 34, contact 33, energized relay switch 32, contact 40, connection 37, junction 35, line 44 to contact 45 of switch S–3(NC–NO), the latter's pole contact 46, line 47, clutch C–3, and line 28, with the alternative path to hot line 26 around switch S–3 and through switch S–4 when switch S–3 is moved to contact 30 by passage of sheet 51 beyond switch S–3.

FIG. 1*c* shows a limit switch 48 in the path of the advancing sheet 11, this being switch S–2(NC–NO), to be actuated to break the connection to the relay switch 32 and hence to clutches C–2 and C–3, thus stopping the sheet 11. The actuation of the limit switch S–2 or 48 effects its closure at contact 28'' to light the pilot light 28'. The light merely indicates that there is a sheet from the stack ready to advance on demand. At this point the apparatus is at rest, except for the indication of readiness by the lighted pilot light 28'.

On demand effected by actuation of a demand switch S–3, the sheet 11 is then advanced by feed rolls 42 while the friction roll 20 previously driven with driven feed rolls 42 is conditioned merely to idle as the feed rolls 42 pull sheet 11 from under the friction roll 20.

A demand switch may be variously operated, even manually. However, for the preferred use of the apparatus, it is shown as operated by feeding a single second sheet 51 into continuously operating feed rolls to be combined with the sheet 11. So long as such sheet 51 is passing switch S–3 the feed rolls 42 operate.

FIG. 1*d* shows the ready-position of the sheet 11 awaiting demand, as evidenced by the light 28′. The absence of rotation arrows shows the stopped positions.

Above the feed rolls 42 there is a region having continuously operating second feed rolls 50 into which is shown as having been fed, a second single sheet 51, such as a tracing. The demand switch S–3 or 52 is positioned to be actuated from first to second position by the sheet 51 advancing and passing the switch at the same predetermined speed as the feed rolls 42 move sheet 11. Upon actuating demand switch S–3 or 52 the hot line 26 at its contact 30 connects through the switch, its contact 46 and line 47 to clutch C–3 again operating first feed rolls 42. Thus, the rolls 42 feed while the friction roll means 20 idles as the sheet 11 moves from under it.

The positions of the limit switch S–2 and demand switch S–3 are preferably such that the sheets 51 and 11 come together with their forward edges substantially coincident. FIG. 1*f* shows the two sheets being brought together for facial contact for entering a third set of continuously operating feed rolls 54.

So long as demand switch 52 is actuated to open at contact 45 and close at contact 30 by passage of the single sheet, clutch C–3 rotates the feed rolls 42. Relative to switch S–4, either sheet 11 or sheet 51 may be the longer. Without switch S–4 a shorter sheet 51 leaving switch S–3 would cause feed rolls 42 to stop. Only when both sheets have passed their switches S–3 and S–4 do the feed rolls 42 stop and thus permit repeating the cycle to bring another sheet in readiness for demand.

Figure 3:
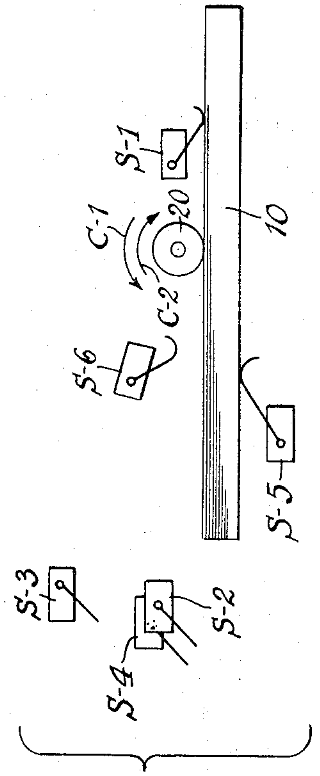
FIG. 3 is a positional diagram for the various switches of FIG. 2.

FIG. 3 shows diagrammatically the general positional relationship of the various switches. Switch S–1 lies to the rear of friction roll 20 both over a paper stack 10. Passage switch S–4 is just forward of limit switch S–2, and above them is shown demand switch S–3. Below the stack is a normally closed switch S–5 opened by removal of the last sheet of the stack, being in series with the starting switch 27 (FIG. 2) to stop the sheet-feeding action. Between the feed rolls 42 and the friction roll 20 is safety switch S–6 (NC) arranged to be opened by accidental crumpling of a sheet ahead of the feed rolls 42. This is located (FIG. 2) between hot line 26 and switch S–2. When opened it is moved to contact 29′ connected by line 29″ to contact 31, thus actuating clutch C–1 to move sheet 11 back to humping position. This action may repeat until the crumpled sheet proceeds normally.

Figure 4:
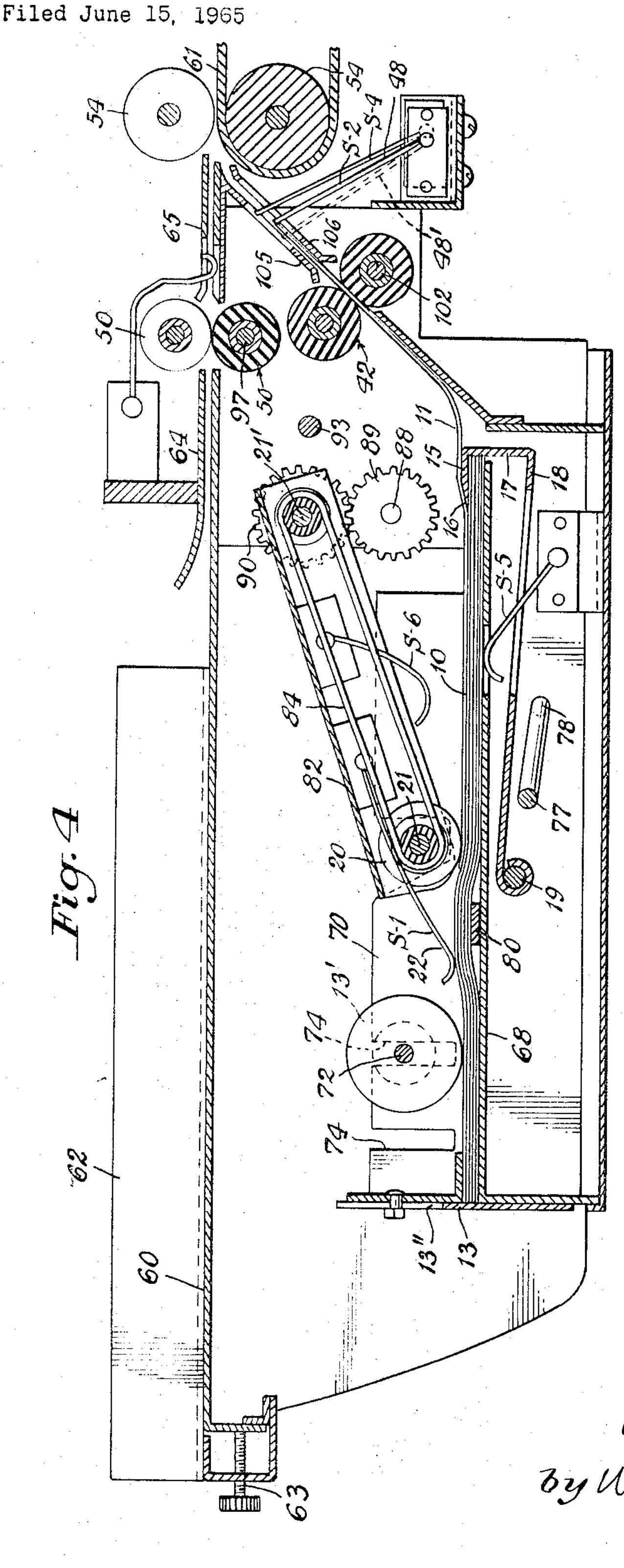
FIG. 4 is a more detailed view in cross-section enlarging on the diagrams of FIG. 1 with the feeding direction reversed.

In FIG. 4 the mechanical structure embodying the principles of FIG. 1 are best illustrated, the parts being numbered as in FIG. 1. A platform 60 is provided on which the demand sheet 51 is fed (to the right) into the continuously operating feed rolls 50 to trip switch S–3 and to feed the sheet 51 into feed rolls 54 which include belt conveyer 61. On platform 60 is a guide plate 62 for sheet 51 adjustable in its lateral position by the screw-clamp structure 63. Sheet 51 is guided to the feed rolls 50 by overlying plate 64 and to feed rolls 54 by overlying plate 65.

Figures 5, 7:
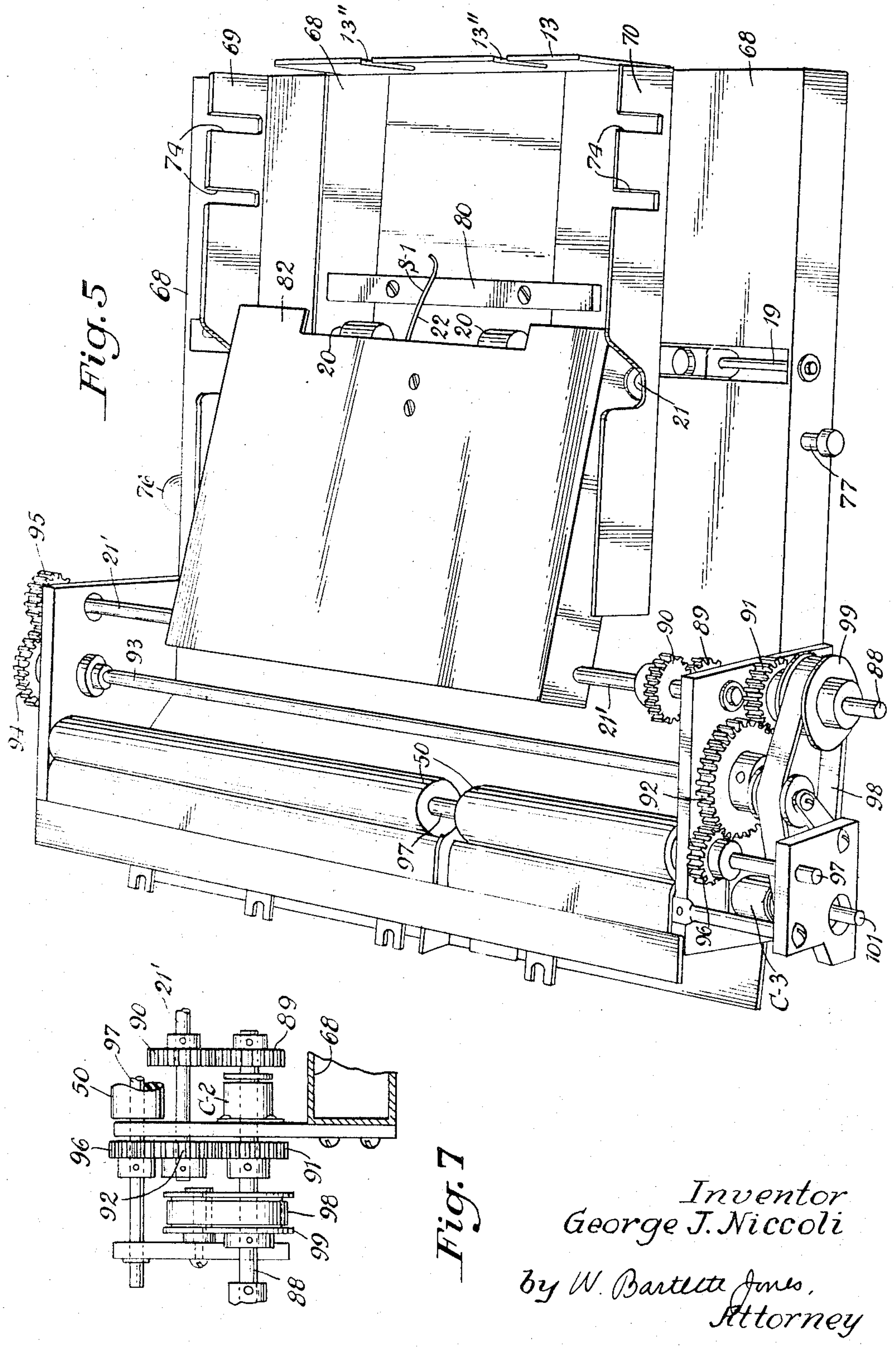
FIG. 5 is a perspective view of a portion of the apparatus with no stack of sheets in place.

Beneath platform 60 the stack of sheets and the feeding means are located. The stack 10 rests on platform 68, which is provided with laterally adjustable side plates 69 and 70 (FIG. 5) to accommodate different widths of stacks, and a rear wall 13, slotted at 13″ for allowing the hold-down 14 to drop with the stack. Rear wall 13 is adjustable by means not described to accommodate various lengths of stack. Side walls 69 and 70 are slotted to hold a shaft 72 on which weighted rolls 13′ hold the stack down. A series of slots 74 is provided to position the rolls 13′ as desired.

The plate 18 hinged at 19 may be raised manually for inserting a stack under the blade 15, by a crank 76 (FIG. 6) on shaft 77 having an inside U-shaped crank portion 78.

On the platform 68 is a cross bar 80 to form a slight rise in the stack 10, causing the stack to have a slight curvature, thus to minimize any tendency of the edges of the sheets to curl upwardly.

The friction roll 20 is carried in a casing 82 pivoted on a companion shaft 21′ which drives shaft 21 by a connecting belt 84. This permits friction roll 20 to drop as the stack is depleted.

Figure 6:
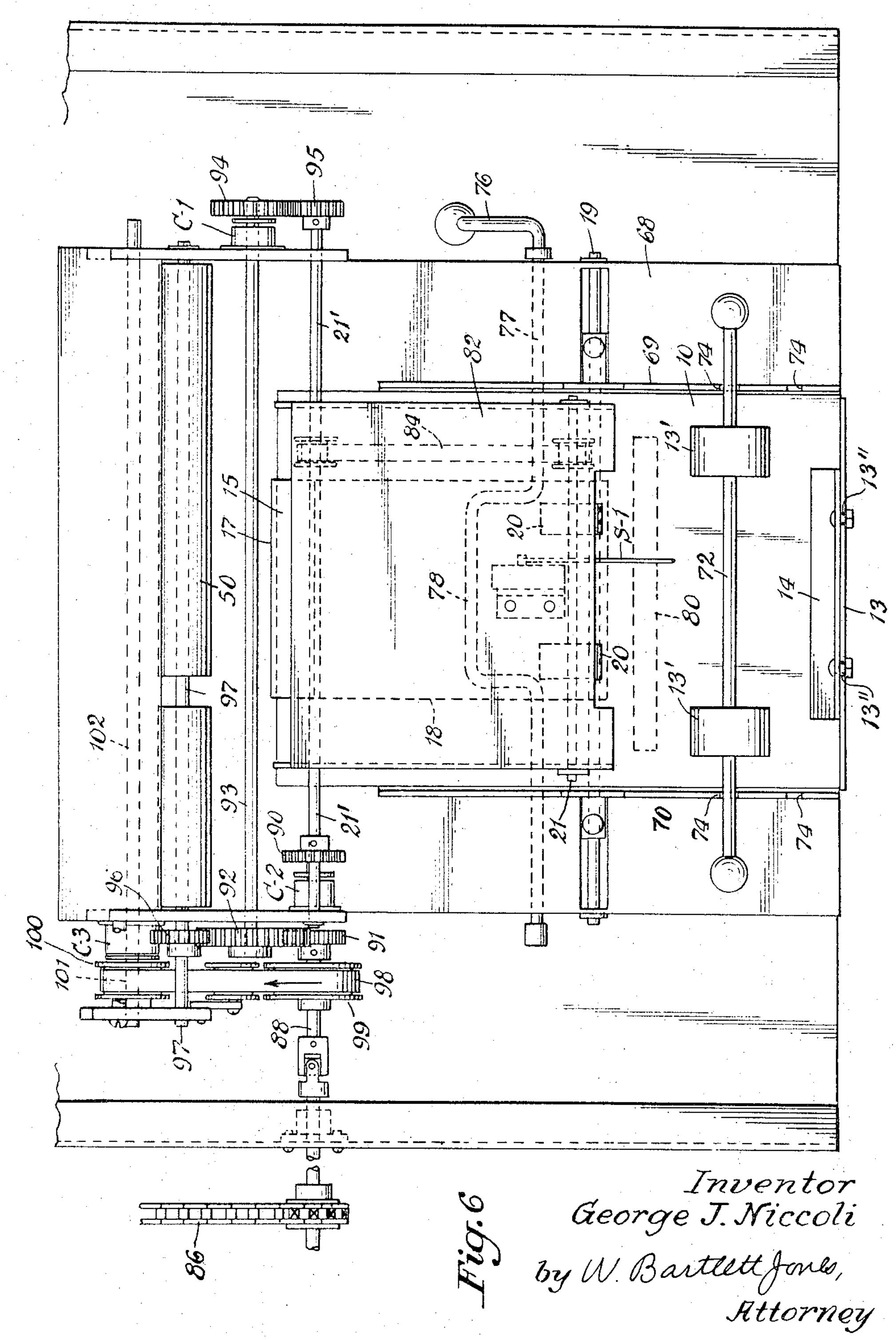
FIG. 6 is a plan view of the apparatus as seen in FIG. 5 but with a stack in place, showing gear trains.

In FIG. 6 a chain drive 86 powers the parts by turning main shaft 88. Shaft 88 is effective through gearing to rotate shaft 21′ in both directions, first to form the hump 11′ and then to reverse and move sheet 11 forwardly. Shaft 88 (FIGS. 5, 6 and 7) has a gear 91 meshing with gear 92 which is fast on one end of shaft 93. On the other end is a gear 94 operable with shaft 93 only when the adjacent magnetic clutch C–1 is actuated for engagement. Gear 94 meshes with gear 95 fast on the shaft 21′, thus turning shaft 21′ so that the friction rolls form the hump. Also, shaft 88 (FIG. 7) has gear 89 loose on the shaft 88 and adjacent magnetic clutch C–2 which when actuated turns gear 89. Gear 89 meshes with gear 90 fast on shaft 21′ which is thus rotated by the actuating clutch C–2 to advance the sheet 11. Gear 92 meshes with gear 96 on shaft 97, which carries the continuous feed rolls 50. The gap shown in feed roll 50 (FIGS. 5 and 6) is the location for switch S–3.

To operate the first feed rolls 42, there is a belt drive 98 from pulley 99 on shaft 88 to a pulley 100 on a shaft 101 alined with shaft 102 and connected by magnetic clutch C–3.

In FIG. 4, the sheet 11 is shown as having passed through feed rolls 42 and between guiding plates 105–106 and against switch S–2 or 48, which it has moved from its normal dotted line position 48′, just short of reaching passage switch S–4. In operating when the sheet 11 passes switch S–4, the plates 105–106 guide it to the continuous feed rolls 54 and conveyer belt 61 where it is timed to coincide with the arrival of a sheet 51 from the platform 60.

Figure 9:
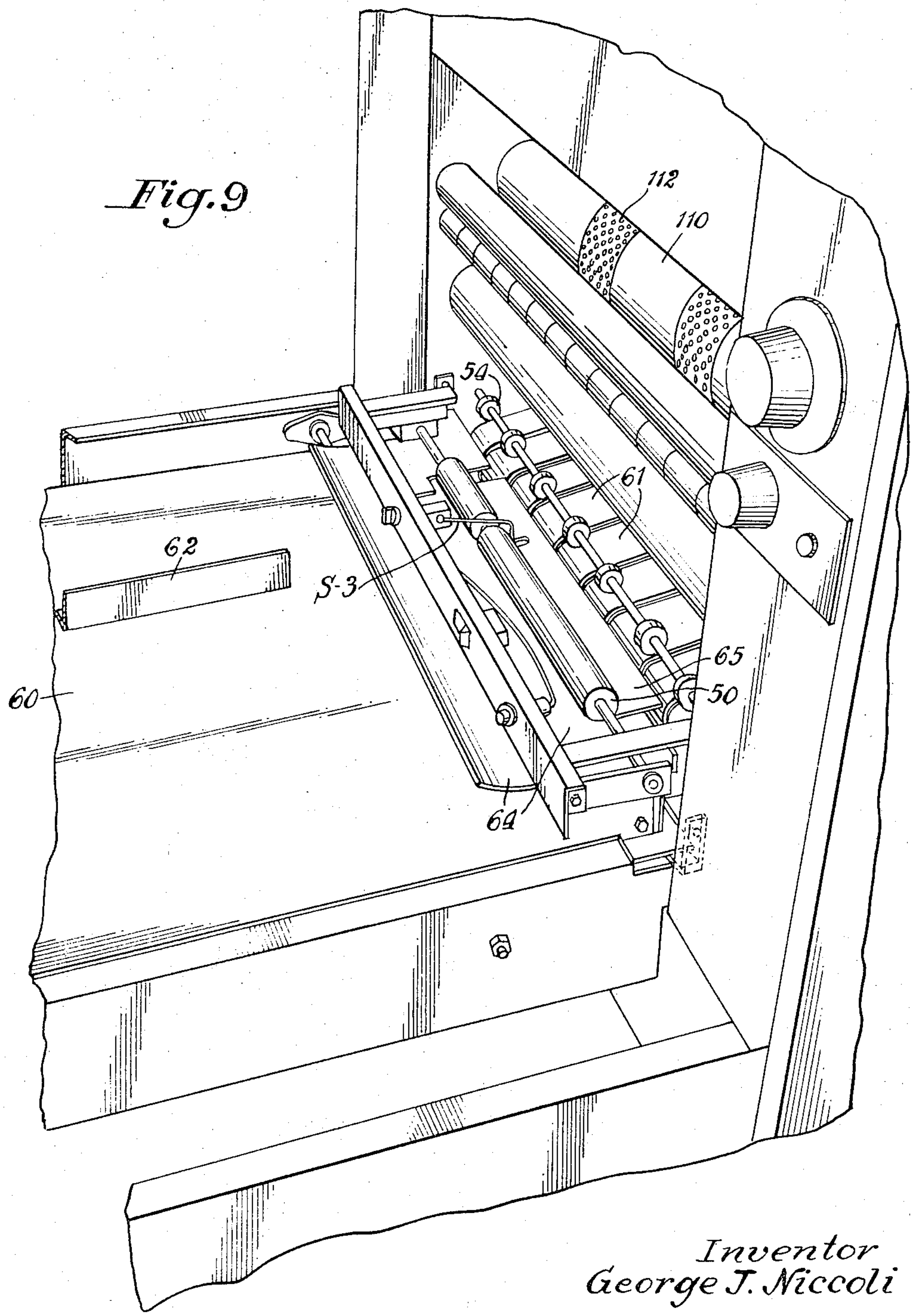
FIG. 9 shows the face of a light-printing apparatus with which the illustrated parts are associated.

In the preferred use of the machine as described the sheet 51 is a tracing or the like through which a sheet 11 is light-printed, as in the diazotype field. FIG. 9 shows apparatus associated with the parts above described for exposing the combined sheets to light. The conveyer belts carry the two sheets to and around a light-printing cylinder (not shown) such as described in Newlin U.S. No. 3,138,374, which delivers the two sheets to a separating cylinder 110 characterized by perforations exerting suction to carry the printed sheet 11 further foward for development and to return the sheet 51 in the rearward direction for again feeding it from the platform 60.

In the operation of the apparatus described above, the feeding of a second sheet from the stack does not take place until the sheets 11 and 51 have left the region of switches S–2, S–3 and S–4, as seen in FIG. 1*g*. Automatically, the cycle repeats as indicated in FIG. 1*b*. An operator intending to insert a second sheet 51 must wait for the sheet 11 to hump and move forward to its ready-position at switch S–2.

Improvements and modifications are now considered which avoid this waiting period. In FIG. 4 illustrated locations of the parts including the hold-down roll 13′, the friction rolls 20, the feed rolls 42 and the switches S–1, S–2, S–3 and S–4 are suitable for the operation as described above. However, for the purpose of causing a sheet 11 to follow a moving sheet 11 as soon as the latter clears the friction rolls 20, the locations are moved for the efficient operation. For the improved operation suitable relative locations are shown in FIG. 1 for sheets 11 which are 11-inches long, giving about 5.5-inches of paper to the rear of the friction rolls 20. FIG. 1*f* shows that the sheet 11 is ready to clear friction rolls 20, so that friction rolls 20 will be available for forming a hump in the underlying top sheet 11. Accordingly, means is provided for initiating hump-formation as soon as the friction rolls 20 are free. The length of the sheet rearwardly of friction rolls 20 is involved in this operation. The sheets 11 may be shorter than shown by moving the back plate 13 forwardly. The length L of sheet 11 between friction rolls 20 and the back 13 is a control to effect a new hump, by new mechanism shown in FIGS. 10 to 17, in which there is an indexing adjustment for different lengths of sheet 11.

In brief, as the feed rolls 42 (FIG. 1) pull sheet 11 forward, clutch C–2 and then the sheet rotate the friction rolls 20. This rotation is converted to rotation of a disk to less than one turn but in amount proportioned to the length L and then to operate a switch so that the rolls are powered in reverse to form a hump after they are stopped by the paper 11 leaving them.

Figure 10:
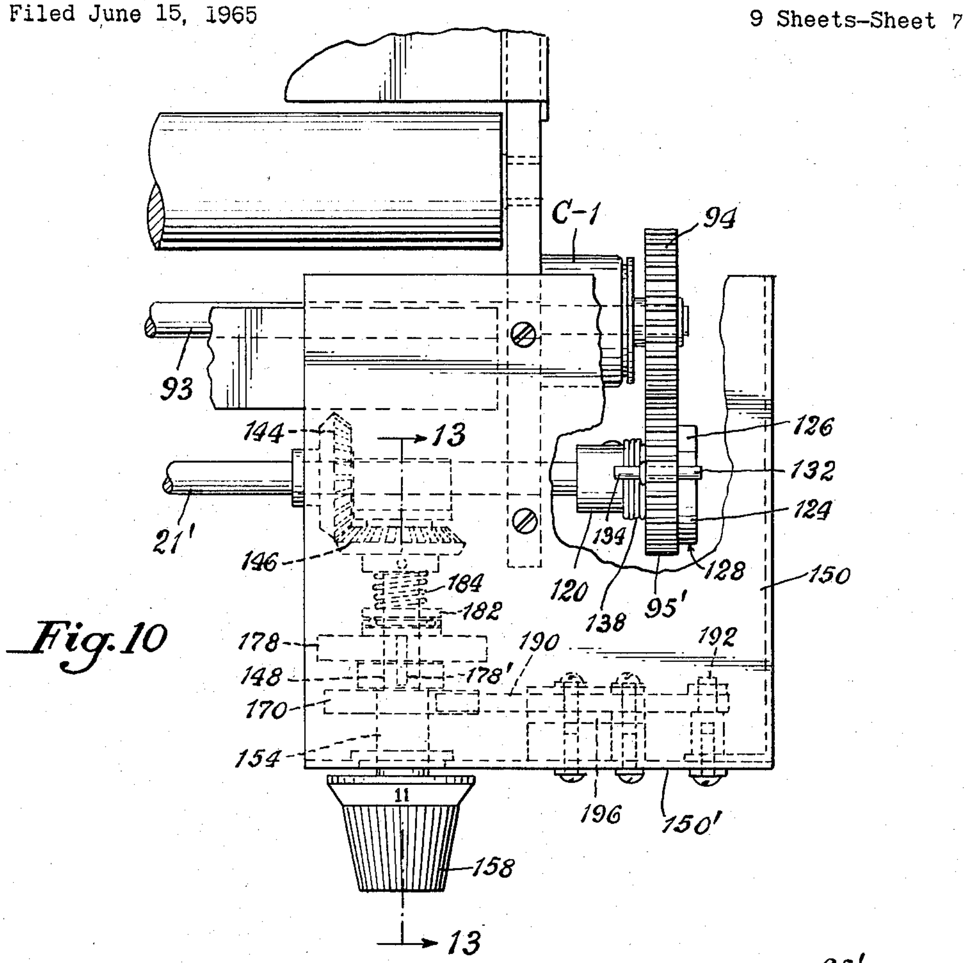
FIG. 10 is a plan view of a modification related to an auxiliary structure controlling movement of a sheet from a stack.
Figure 12:
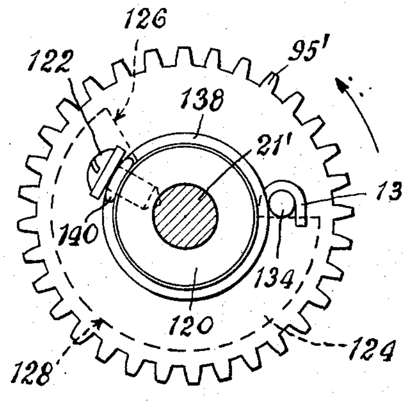
FIG. 12 is a side view of the structure in FIG. 11 looking to the right of FIG. 11.
Figure 11:
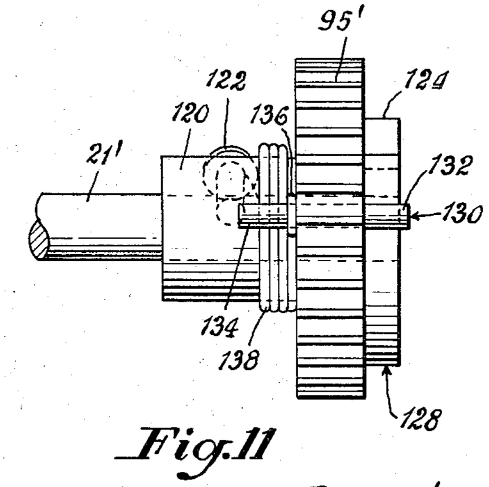
FIG. 11 is an enlarged view in elevation of one of the gears and shafts in FIG. 10.

This action is effected by modifications along the shaft 21'. In FIG. 6, at the right, it is shown that shaft 21' is powered to form a hump in sheet 11 with and by gear 94, by reason of the meshing gears 94 and 95. Clutch C–2 causes shaft 21' to reverse its direction when clutch S–1 is disengaged, and the sheet 11 continues the rotation after clutch C–2 is disengaged. FIG. 10 shows modifications on shaft 21'. The gear 95' is not positively rotated by gear 94 when shaft 21' is first turned to form a hump in top sheet 11. There is a slight delay. Gear 95' is loose on a hub 120 made rigid with shaft 21' by set screw 122 (FIGS. 11 and 12). The outer end of hub 120 has a recessed disk 124 having a recess 126 of about 120° in its periphery 128. A fixed pin 130 passes through the gear. The outer end 132 of the pin rides in the recess 126. The other end 134 of the pin is hooked over by one end 136 of coiled spring 138 around the hub of which the other end 140 is secured to the hub by the screw 122. The arrangement is such that when gear 94 rotates gear 95' in the direction of the arrow in FIG. 12 to rotate the friction rolls 20 for hump-formation, the loose gear 95' must turn 120° with pin 130 riding in the recess 126 before the pin end 132 engages the recessed disk 124 to turn shaft 21'. This lost motion allows the sheet 11 to pass slightly beyond the friction rolls 20 before the rolls reverse to form a hump.

Also on shaft 21' (FIG. 10) there is a bevel gear 144 meshing with bevel gear 146 on one end of a stub shaft 148 within a housing 150 (FIG. 13), leading to an indexing means. Over the other end 152 of shaft 148 there is a sleeve-end 154 of a shaft 156 to the end of which outside of housing wall 150' there is secured a manual indexing knob 158 by set screw 160. Stub shaft 148 is rotatable within the sleeve-end 154 of shaft 156. A bearing ball 162 is located in shaft 156 at the end 152 of shaft 148. A retaining collar 164 is secured to shaft 156 by set screw 166 in position to hold a bearing 168 set in housing wall 150'.

Figure 14:
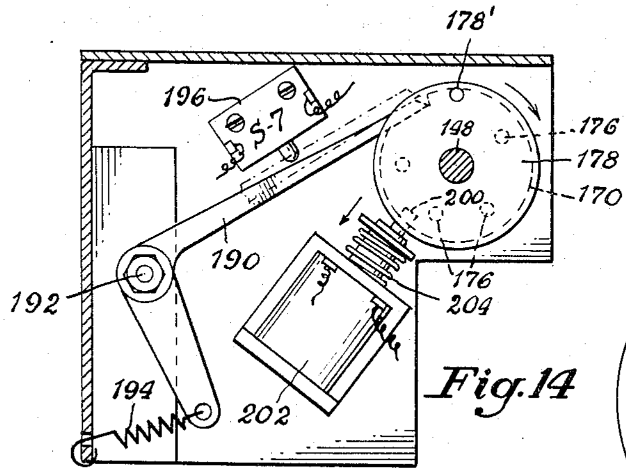
FIG. 14 shows an electrical switch and a solenoid associated with the indexing structure.

The indexing means is adjustable for different lengths of paper. It comprises a disk 170 rigid on the sleeve-end 154 of shaft 156, with a projecting indexing pin 172, in the form of a hollow-screw threaded into the disk. A spring-pressed ball 174 in the end of the pin 172 fits into holes 176 in a companion disk 178 loose on shaft 148. Disk 178 is slidable on shaft 148 (FIG. 13) being pressed against a loose friction disk 179 between it and a fixed collar 180 on shaft 148, thus forming a slip clutch. A thrust bearing 182 and spring 184 are positioned between the sliding disk 178 and the gear 146. Disk 178 has near its periphery a pin 178' extending in the axial direction into the space between disks 178 and 170. Disk 170 has a notch 186 in its periphery presenting a radial obstructing wall 188 to the end of an arm 190 normally riding on the periphery of disk 170 (FIGS. 14 and 16). Arm 190, which operates an electrical switch to effect hump-formation, is pivoted at 192, and in the form of a bell crank is urged against disk 170 by spring 194. So positioned it rides on the periphery of disk 170 until it enters notch 186, thereby stopping disk 170. On entry it closes switch 196 or S–7, thus energizing clutch C–1 to form a hump.

The disk 178 tends to rotate with shaft 148 by reason of the slip clutch when the shaft 21' is rotated during forward movement of sheet 11 under the friction rolls 20. At a certain time rotation is prevented by means obstructing circular movement of the pin 178'. Said means is an electrically activated pin 200 normally resting in the path of pin 178'. Obstructing pin 200 is part of a solenoid 202 which when energized pulls the pin 200 against spring 204 and away from the path of pin 178', which spring returns the pin 200 to obstructing position when the solenoid is deenergized. The operation of demand switch S–3 and of passage switch S–4 during passage of the papers of an assembly energizes the solenoid 202 so that disk 178 is free to turn clockwise in FIG. 14 without obstruction. The final turning power is that of the sheet 11 being pulled by rolls 42 or 54 from under the friction rolls 20. So as soon as the sheet 11 leaves the friction rolls, there is no turning power. At this point switch S–7 is closed by arm 190 in notch 186 (FIG. 14). Thus disk 170 cannot turn counterclockwise in FIG. 16, so that during the ensuing rotation of shaft 21' to form a hump, there is slippage at friciton disk 179. The circumference of disk 170 is adjusted so that nearly a complete revolution of it is proportioned to the longest length L of paper operating it. The end of the turning of disk 170 brings the notch 186 to the arm 190 to stop the rotation and to close switch S–7. For shorter lengths L of paper the starting point for the revolution is adjusted by the indexing device.

The indexing pin 172 connects disks 170 and 178 so that they rotate together, friction-driven disk 178 turning disk 170 and shaft 156. Disk 170 is rotated clockwise in FIG. 16 during the pulling of paper from under friction rolls 20, until arm 190 enters notch 186.

By setting the indexing pin 172 in different ones of holes 176 in disk 178 the arcuate separation of the solenoid-obstructed pin 178' on disk 178 and of the notch 186 in disk 170 is varied. The holes 176 are positioned to vary such arcuate separation for different lengths of paper.

As shown the linear travel of the circumference of disk 170 is proportioned to the linear travel of the moving sheet 11 to clear the friction rolls. However, it is to be understood that the relative diameters of gears 144 and 146 constitute a proportioning means which controls the linear travel of the circumference relative to that of sheet 11, thus controlling the diameter of disk 170.

During the operation of clutch C–2 moving sheet 11 toward switch S–2, the solenoid 204 is deenergized and pin 200 is in position to obstruct pin 178' and stop clockwise rotation (FIGS. 14 and 16) of disks 170 and 178, while shaft 148 still turns, thus having moved notch 186 away from arm 190 a distance dependent on the setting of the indexing pin. Then when clutch C–2 is disengaged and clutch C–3 continues forward movement of the paper under the friction roll, the solenoid 204 is energized. This pulls pin 200 away from pin 178' and allows clockwise rotation (FIGS. 14 and 16) to continue for the remainder of its travel, predetermined by the index setting, until arm 190 again falls into notch 186.

In FIGS. 1*e* and 17 the demand switch S–3 is closed by the sheet 51, such as a tracing, as the sheet 51 is fed forward by feed rolls 50 to be combined with a sheet 11 in ready-position. Closing switch S–3 deenergizes clutch C–2 and continues to energize clutch C–3 to turn feed rolls 42 (FIG. 1*f*) to pull sheet 11 from under friction rolls 20 which are free to be turned by the sheet. The demand switch S–3 is effective to energize solenoid 202, thus withdrawing obstructing pin 200. This permits disks 170 and 178 to turn clockwise in FIGS. 14 and 16 keeping arm 190 on the periphery, where it holds switch S–7 or 196 open until arm 190 enters notch 186. Then it closes switch S–7 establishing the circuit to energize clutch C–1 and initiates action to form a hump, the action being slightly delayed at gear 95'. Switch S–7 is in parallel (FIG. 17) with switch S–2 for energizing clutch C–1.

In the circuitry of FIG. 2, switch S–2 will not operate clutch C–1 until the sheet 11 has passed it.

During the operation of clutch C–2 turning the friction rolls to move the sheet forward, the solenoid 202 is deenergized and pin 200 limits clockwise (in FIG. 16) rotation of disks 170 and 178 by obstructing pin 178' carried by disk 178. This sets disk 170 at a starting position for a length L of sheet 11, according to the set of indexing pin 172 in a hole 176.

FIG. 17 shows the circuitry involving the mechanism above described. Certain parts retained from FIG. 2 bear the same numerals. The relay 38 in FIG. 17 operates three switches 32, R–2 and R–3, the connecting solenoid-operated member being designated by a dashed line 38'. In FIG. 17 switch S–5 is open until a stack of sheets is placed in the machine. Then, on closing starting switch 27 a circuit is established as follows: switch 27, switch S–5, line 28, clutch C–1, contact 31, closed relay operated switch 32, contact 34', junction E–10', contact 34, switch S–2 (opened later at ready-position of sheet 11), contact 29, junction E–10, contact E–11, normally closed switch S–6 (opened later by any crumpling of sheet 11), hot line 26. Clutch C–1 thus moves the sheet 11 to form a hump which closes switch S–1 to effect forward feed of sheet 11.

On forming a hump by the sheet 11, the hump closes switch S–1 which causes sheet 11 to be moved forward to a ready-position where it waits for demand as by supplying a tracing. At the ready-position it lights pilot light 28'. Closure of switch S–1 by the hump establishes the following circuits: (1) hot line 26, closed switch S–1, line 36, junction 35, line 37 to junction E–12, relay coil 38, line 39, junction E–13, line 28 through closed switch S–5; (2) a second circuit from junction 35 through clutch C–2 to line 28 to energize clutch C–2; (3) from junction 35, contact E–16, relay switch R–2, line 44'', junction E–14, clutch C–3, and line 28, and (4) hot line 26, switch S–6, contact E–11, junction E–10, contact 29, switch S–2, contact 34, junction E–10', contact 34, switch 32, contact 40, line 40', junction E–12, line 37, junction 35, clutch C–2 and line 28. Energizing relay coil 38 moves relay switch 32 to contact 40 and away from contact 31, thus stopping clutch C–1 from moving sheet 11 rearwardly. As soon as the hump is removed switch S–1 opens, without effect, because of the circuit (4) last above described. The circuit (2) above energizes clutch C–2 which causes the sheet 11 to move forward until its forward edge reaches and moves switch S–2 from contact 34 to contact 28'' which leads to and energizes pilot light 28', through line 28$^a$ to normally closed contact 28$^b$ of switch S–4, line L–10, junction E–14, and then in two parallel connections (a) line L–11, clutch C–3 and line 28, and (b) line 44'', relay switch R–3, contact E–18, solenoid 202, and line 28. Not enough current can flow through the pilot light 28' to operate clutch C–3 and solenoid 202. At this point the apparatus is idle, except that the pilot light indicates that a sheet 11 is stopped and ready to be assembled with a tracing when the latter is fed in.

On feeding in a tracing sheet 51, it is effective to energize clutch C–3 to move sheet 11 so that it assembles with sheet 51, both entering continuous feed rolls 54. On feeding in the tracing it closes normally open demand switch S–3, completing a circuit from hot line 26, contact 30, switch S–3, line 44', junction E–14, line L–11, clutch C–3 and line 28.

The travel of sheet 11 of the assembly moves switch S–4 from contact 28$^b$ (thus extinguishing the pilot light 28') and to contact 28$^c$, which is connected to hot line 26, thus continuing to energize clutch C–3 until the sheet 11 of the assembly leaves switch S–4 or until sheet 51 leaves switch S–3, whichever is later, to open either one or both. The closure of switch S–4 (at contact 28$^c$) or the closure of switch S–3 continues through line 44'' to relay operated switches R–2 and R–3. With current through either one of the switches S–3 and S–4, clutch C–3 is energized, turning rolls 42 to advance the assembly. The switch S–2 is maintained at contact 28'' by passage of the sheet, but the pilot light is cut off by the passage of the sheet moving switch S–4 to contact 28$^c$. The relay coil 38 remains deenergized by the switch S–2 moved from contact 34 so that relay-operated switch 32 is closed at contact 31 preparatory to again energizing clutch C–1. The deenergized relay 38 moves switch R–2 from contact E–16, thus stopping clutch C–2, and moves switch R–3 to contact E–18, which leads to and energizes solenoid 202, so long as a passing assembly closes switch S–3 or holds switch S–4 at contact 28$^c$. Energized solenoid 202 thus pulls pin 200 from obstructing position, allowing the full mechanism of FIG. 13 to turn clockwise in FIGS. 14 and 16.

Thus, before the assembly has passed through, and after sheet 11 leaves the friction rolls (see FIG. 1*f*), the switch S–7 is closed to by-pass switch S–2 and a new sheet is moved to form the hump, by the current flowing through switch 32, contact 31 and clutch C–1. At this time the assembly is moving so as to close switch S–3 or move S–4 to 28$^c$, or both, thus maintaining the solenoid 202 energized.

While the assembly is moving past switches S–3 and S–4, a new hump closes switch S–1, thus energizing clutch C–2 and the relay 38. Thus relay 38 breaks connection to clutch C–1 at switch 32, and breaks the connection to the solenoid 202 at switch R–3. Thus, pin 200 is released to obstruct rotation of disk 178 at the time the sheet moves forward from the hump. After the assembly leaves switches S–3 and S–4, the new sheet 11 will be at or approaching switch S–2, switch S–3 will be open, and switch S–4 will be at contact 28$^b$ for lighting the pilot light 28' when the sheet 11 opens switch S–2.

I claim:

1. The method of feeding sheets from a stack thereof comprising obstructing rearward movement of the stack and its top sheet, holding down the front end of the top sheet with a thin blade resting thereon, moving the top sheet rearwardly out from under said blade and forming a hump in the sheet, moving the top sheet forwardly over said blade, said movings of the sheet being effected by applying power to friction roll means on the sheet capable of freely turning when disconnected from a source of power, said forward movement of the sheet feeding it to pulling rolls to advance the forward movement, disengaging said friction roll means from its source of sheet-forwarding power when said pulling rolls advance the sheet, whereby said friction roll means is turned by the sheet being pulled from thereunder, and after said friction roll means is idled by departure of the sheet and while said sheet is being moved forwardly by said feed rolls, applying power to said friction roll means to move the next sheet from under said blade and repeating the cycle.

2. Method according to claim 1 in which said last-mentioned application of power is accomplished substantially at the time said friction roll is idled.

3. The method of moving a top sheet of a stack forwardly over over-ridable means holding down at least a portion of the forward edge of the sheet, which stack is positioned under and in contact with friction roll means on an axis at right angles to the direction of feed, which method comprises holding down a rear portion of the sheet against rearward movement, sliding the forward portion of the sheet rearwardly sufficiently to free it from said means and forming a hump in said sheet, said rearward sliding of the sheet being effected by application of power to rotate said friction roll means, actuating an electric switch by formation of said hump and by actuation of said switch reversing the powered rotation of said friction roll means and thereby effecting forward sliding movement of the sheet and over-riding said means, and also by actuation of said switch actuating feed roll means in the path of said sheet to carry the forward edge of the sheet at least a predetermined distance from the stack, and while said feed rolls move the sheet and while said sheet is beneath said friction roll means freeing said friction roll means from applied power, whereby the moving sheet rotates said friction roll means, and when said sheet has moved from under said friction roll means and is being moved forwardly by the actuated feed rolls, applying power to rotate the friction roll means again to form a hump in the remaining top sheet of the stack whereby to repeat the cycle.

4. In apparatus for feeding a first sheet from a stack of sheets into a position of readiness to move forward in contact with a moving second sheet from another source, friction roll means operable in one direction to move a forward portion of said first sheet in a backward direction against a stationary rear portion and thereby forming a hump in the sheet, first powered means to rotate said friction roll means to form said hump, normally inactive second powered means to reverse the rotation of said friction roll means to move said first sheet forwardly from said stack, normally inactive third powered means for moving said first sheet forwardly and away from said friction roll means at the same rate as said second sheet for assembly therewith, an electric switch operated by the forming hump to deactivate said first powered means and activate said second and third powered means, a stop switch in the path of said forwardly moving sheet operated by contact of the sheet therewith, said stop switch on operating deactivating said second and third powered means to arrest movement of said first sheet before the sheet leaves said friction roll means, a demand switch arranged in the path of a forwardly moving second sheet in position alined with said first sheet, said demand switch being operated only by the second sheet moving past it, a passage switch operated only by the first sheet moving past it, said demand and passage switches when so operated activating said third powered means, said friction roll means being free to idle during deactivation of said first and second powered means and being positioned over said stack at a location such that said third powered means pulls said first sheet from under the friction roll means thereby turning said friction roll means, rotary means associated with said friction roll means and operable thereby when the latter is powered by said moving first sheet, said rotary means having a limited extent of rotation less than 360°, said extent of rotation being proportioned by that portion of the length of the first sheet which powers said friction roll means, a paper-feed switch operable by said rotary means to activate said first powered means, said paper-feed switch being so operated at the end of said limited rotation, whereby a following first sheet from the stack is fed toward said stop switch while said activated third powered means is moving said first sheet in a path forward of and away from said friction roll means.

5. Apparatus according to claim 4 in which proportioning gearing connects said friction roll means to said rotary means.

6. Apparatus according to claim 4 in which the length of the stack to the rear of said friction roll means is variable, in which there is indexing means, and in which the starting position of said rotary means for its limited rotation is correspondingly variable by setting said indexing means.

7. Apparatus comprising in combination a geared driving shaft, a shaft coaxial with said geared shaft rotatable with respect thereto, said geared shaft having in succession thereon a fixed gear, a surrounding compression spring in compression, a thrust bearing, a slidable disk with a friction force, a friction disk, and a fixed collar with a friction face, said slidable disk having an axially directed obstructable projection movable in a circular path, and having a circular series of indexing holes therein; said coaxial shaft having a fixed control disk thereon adjacent said fixed collar and spaced away from said slidable disk, said control disk having an indexing pin across said space for selective entry into one of said holes, an indexing knob fixed on the end of said coaxial shaft, said control disk having a notch movable in a circular path for entry of the hereinafter-mentioned switch arm, said switch arm on entry into said notch obstructing rotation of said control disk in one direction but permitting rotation in the other direction to move said arm from said notch, a switch, a switch arm actuating said switch on entry in said notch, an obstructing pin normally in the path of said obstructable projection for limiting joint rotation of said slidable disk and the index connected control disk, a solenoid arranged when energized to move said pin from obstructing position; a driving shaft for said geared shaft, a gear on said driving shaft meshing with the gear on said geared shaft, first controlled powered means to rotate said driving shaft in a first direction, second controlled means to rotate said driving shaft in the second direction, said two powered means when inactive permitting said driving shaft to idle, the rotation of said driving shaft in the second direction being effective to rotate said control disk in the direction to remove said arm from said notch and simultaneously to rotate the index-connected slidable disk into its position obstructed by said pin; friction roll means on said driving shaft positioned over a sheet of paper, third controlled powered means to pull said sheet from under said friction rolls thereby turning said driving shaft, means associated with said sheet-pulling powered means simultaneously to energize said solenoid and permit rotation of said index-connected disks from obstructed position, the extent of rotation thereof being limited by the setting of the index pin which setting is predetermined by that portion of the length of sheet being pulled under said friction rolls, and being set so that the said switch arm enters said recess and terminates rotation just before the sheet leaves the friction rolls, the said switch operated by said arm on entering said recess being effective to activate the first powered means for said driving shaft, said first powered means comprising lost-motion gearing between the motive power and the friction roll shaft, whereby said friction rolls do not turn in said first direction until the sheet has been pulled free of said friction rolls.

8. Apparatus comprising in combination a geared driving shaft, a shaft coaxial with said geared shaft, a friction slip connection between said two shafts, a rotary member on said coaxial shaft, means movable in a circular path projecting axially from said rotary member, movable obstructing means normally in position to prevent rotation of said rotary means in a first direction and permitting rotation for not more than one revolution in the second direction, said rotations being effected by said geared shaft through said slip connection, a recess in the periphery of said rotary member for receipt of a switch arm normally riding on said periphery and biased to enter said recess, said recess presenting an obstruction to rotation in said second direction when said arm enters said recess, rotation of the geared shaft in said first direction turning said rotary member to obstruction by said movable obstructing means, the following rotation of said geared shaft in the second direction turning said rotary member from its position obstructed by said movable means to a position obstructed by said switch arm in said recess, means associated with the geared shaft operable to withdraw said movable means from obstructing position when said geared shaft turns in said second direction, and means operated by said arm on entering said recess to reverse the rotation of said geared shaft into said first direction.

9. Apparatus for feeding a top sheet from a stack of sheets into a position of readiness to move forward on demand, friction roll means operable in one direction to move a forward portion of said top sheet in a backward direction against a stationary rear portion and thereby forming a hump in the sheet, first powered means to rotate said friction roll means to form said hump, normally inactive second powered means to reverse the rotation of said friction roll means to move said top sheet forwardly from the stack, normally inactive third powered means for forwardly moving the sheet away from said friction roll means, an electric switch operated by the forming hump to deactivate said first powered means and to activate said second and third powered means, a stop switch in the path of said forwardly moving sheet operated by contact of the sheet therewith, said stop switch on operating deactivating said second and third powered means to arrest movement of said top sheet before the sheet leaves said friction roll means, a normally inactive demand switch arranged for operation to cause said sheet to advance beyond said stop switch, a passage switch operated only by said sheet moving past it, said demand and passage switches when so operated activating said third powered means, said friction roll means being free to idle during deactivation of said first and second powered means and being positioned over said stack at a location such that said third powered means pulls said sheet from under the friction roll means thereby turning said friction roll means, rotary means associated with said friction roll means and operable thereby when the latter is powered by said moving sheet, said rotary means having a limited extent of rotation less than 360°, said extent of rotation being proportioned by that portion of the length of said sheet which powers said friction roll means, a paper-feed switch operable by said rotary means to activate said first powered means, said paper-feed switch being so operated at the end of said limited rotation, whereby a following sheet from the stack is fed toward said stop switch while said activated third powered means is moving said top sheet in a path forward of and away from said friction roll means.

10. Apparatus according to claim 9 in which proportioning gearing connects said friction roll means to said rotary means.

11. Apparatus according to claim 9 in which the length of the stack to the rear of said friction roll means is variable, in which there is indexing means, and in which the starting position of said rotary means for its limited rotation is correspondingly variable by setting said indexing means.

References Cited

UNITED STATES PATENTS

| | | | |
|---|---|---|---|
| 2,733,063 | 1/1956 | Corey | 271—57 |
| 3,279,787 | 10/1966 | Niccoli | 271—21 |

EUGENE R. CAPOZIO, *Primary Examiner.*

P. WILLIAMS, *Assistant Examiner.*